Aug. 6, 1940.        C. C. BALDWIN         2,210,194
PACKAGE FOR MERCHANDISING CHEWING GUM
Filed Oct. 12, 1938       2 Sheets-Sheet 1
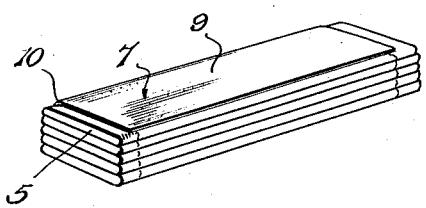
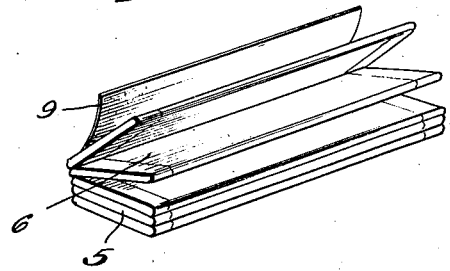
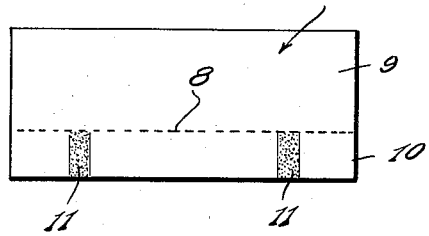
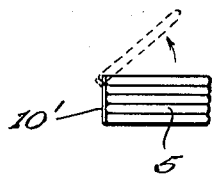
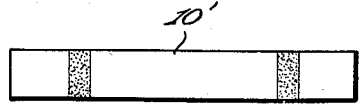
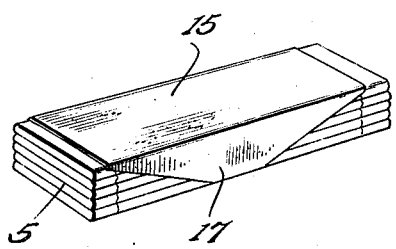
Inventor
Charles C. Baldwin.
By Lacey & Lacey, Attorneys Aug. 6, 1940.   C. C. BALDWIN   2,210,194
PACKAGE FOR MERCHANDISING CHEWING GUM
Filed Oct. 12, 1938   2 Sheets-Sheet 2
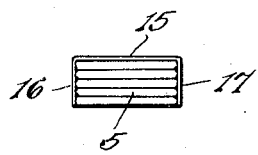
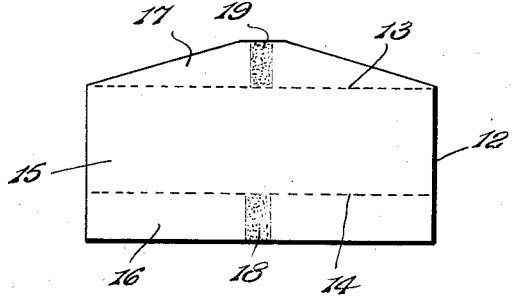
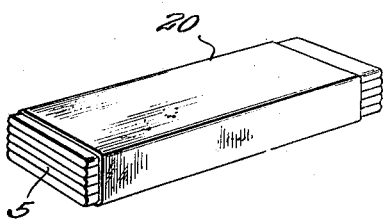
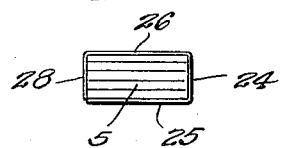
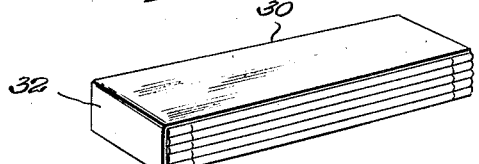
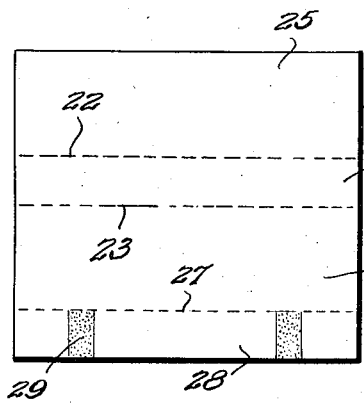
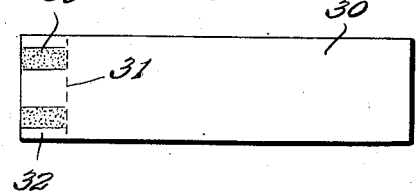
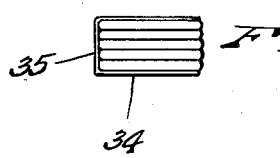
Inventor
Charles C. Baldwin.
By Lacey & Lacey, Attorneys Patented Aug. 6, 1940

2,210,194

UNITED STATES PATENT OFFICE 2,210,194

PACKAGE FOR MERCHANDISING CHEWING GUM

Charles C. Baldwin, St. Louis, Mo.

Application October 12, 1938, Serial No. 234,709

10 Claims. (Cl. 99—180)

This invention relates to packages for merchandising edible commodities and more particularly to a package especially designed for vending chewing gum in stick form.

The object of the invention is to provide a package of simple and inexpensive construction adapted to hold a plurality of independently wrapped sticks of chewing gum in compact form, the sticks of gum comprising the package being so arranged as to permit selective but preferably successive detachment of the individual sticks when desired, leaving the remaining sticks bound together so as to prevent the unused sticks from becoming separated and lost in the pocket or otherwise misplaced.

A further object of the invention is to provide a package including a binder having a plurality of superposed individually wrapped sticks of chewing gum secured thereto along one edge thereof in book form so that by merely flexing the package the sticks of gum will be separated at their free edges to permit convenient detachment of the sticks from the binder.

A further object is to provide a chewing gum package or container, the construction of which is such as to permit the display of advertising matter on the binder as well as on the wrappers of the individual sticks of gum regardless of how the package is supported in the hand during the severance of the sticks from the binder.

A still further object of the invention is generally to improve this class of devices so as to increase their utility, durability and efficiency.

In the accompanying drawings forming a part of this specification and in which similar numerals of reference indicate corresponding parts in all the figures of the drawings:

Figure 1 is a perspective view of a package of chewing gum embodying the present invention, the bottom of the package being shown uppermost for sake of clearness, Figure 2 is a similar view showing the package flexed so as to separate the free edges of the individual sticks to permit ready severance thereof from the binder, Figure 3 is an end view, Figure 4 is a plan view of the cover or binder detached, Figure 5 is an end view illustrating a modified form of the invention, Figure 6 is a plan view of the binder shown in Figure 5 detached, Figure 7 is a perspective view illustrating a further modification and looking at the bottom of the package, Figure 8 is an end view of Figure 7, Figure 9 is a plan view of the cover or binder used on the package shown in Figure 7, Figure 10 is a perspective view showing a further modification of the invention, Figure 11 is an end view of Figure 10, Figure 12 is a plan view of the cover or binder shown in Figure 10 detached, Figure 13 is a perspective view illustrating another form of the invention, Figure 14 is a plan view of the cover or binder applied to the package shown in Figure 13, and Figure 15 is an end elevation illustrating a further modification.

The improved device forming the subject matter of the present invention may be used for housing and merchandising any kind of edible commodity in package form, and in Figure 1 of the drawings is shown applied to a package of chewing gum, the sticks 5 of which are individually wrapped, as indicated at 6, and disposed one upon the other in superposed relation, as shown.

In carrying the invention into effect, I provide a cover member or binder constructed from a single blank 7 preferably formed of paper and of a length slightly less than the length of the individual sticks of gum so that, when the binder is applied to the package, the terminal portions of the sticks of gum will be exposed at the opposite ends of said package. The blank 7 is provided with a longitudinally disposed fold line 8 defining a flap or extension 9 and a binding element 10 to which is applied at predetermined points in the length thereof a quantity of glue or other adhesive material 11. The binding element is secured to one longitudinal edge of the package by pressing the adhesive material 11 in engagement with the adjacent edges of the individual sticks of gum 5 so that said sticks of gum will be firmly secured together in compact form along one edge leaving the other edges of the sticks free to separate when the package is flexed. The flap 9 extends over the surface of the adjacent stick of gum and provides a convenient means for the display of suitable advertising matter, and it will, of course, be understood that advertising matter may also be displayed on the upper and lower surfaces of the wrapper of each stick of gum. It will thus be seen that by supporting the package in the hand and slightly flexing the same the individual sticks of gum may be separated like the leaves of a book so as to permit said sticks of gum to be conveniently grasped and detached from the binder 10, leaving the remaining sticks of gum bound together in compact form so as to prevent accidental separation and loss of the unused sticks of gum. In other words, by merely grasping the uppermost stick of gum in the package and exerting a slight tearing action thereon, said stick may be readily detached from the package for consumption, leaving the remaining sticks intact until it is desired to again detach a stick of gum from the package. When sticks of gum are disposed within a package in loose formation as at present, it often happens that after the package is once broken open to permit the removal of a stick of gum, the remaining sticks become separated and either lost in the pocket of the user or otherwise misplaced, and the present invention provides a convenient means whereby the unused sticks of gum may be held together until the user desires another stick which may be readily detached from the binder in the manner previously stated. It will, of course, be understood that, if desired, the binder 10 may be coated with adhesive material throughout its entire length, but in actual practice, it is found that the location of the adhesive material, as shown in Figure 4 of the drawings, will suffice to secure the sticks of gum together in package form.

In some cases the covering flap 9 may be dispensed with, in which event, the binder will be of the construction indicated at 10' in Figures 5 and 6 of the drawings.

In Figures 7 to 9 inclusive of the drawings, there is illustrated a modified form of the invention, in which a blank 12 of the construction shown in Figure 9 is utilized for holding the sticks of chewing gum in compact relation. The blank 12 is provided with spaced longitudinal fold lines 13 and 14 defining an intermediate cover portion 15 and terminal portions 16 and 17, one of which constitutes the binding element and the other a securing flap. In this form of the device, the binding element is secured to one longitudinal edge of the package of gum by suitable adhesive material 18 and the cover portion 15 extended over and around said package with the flap 17 secured to the other longitudinal edge of the package by a suitable adhesive 19 secured to the inner face of the flap, as shown. The adhesive 19 on the flap 17 need not extend the entire width of the flap as the purpose of said adhesive is merely to temporarily hold the flap in position on the package. In this form of the device, the adhesive materials 18 and 19 are preferably disposed in vertical alinement, but it will, of course, be understood that, if desired, the adhesive on the binder 16 may be arranged at spaced intervals along the length thereof and the adhesive on the flap disposed in staggered relation thereto. In using this form of the device, it is merely necessary to loosen the end of the flap 17 from the adjacent sticks of gum in the package when the uppermost stick of gum may be readily detached from the binding element 16 by grasping the free edge thereof and exerting a slight tearing action on the stick of gum in the manner previously stated.

In Figures 10 to 12 inclusive of the drawings, there is illustrated a cover or binding element 20 which entirely encircles or surrounds the package of gum. In this form of the device, I provide a blank 21 of the construction shown in Figure 12 of the drawings, said blank being provided with spaced longitudinal fold lines 22 and 23 defining an intermediate side wall 24 and top and bottom walls 25 and 26. One of the walls, preferably the wall 26, is provided with a fold line 27 defining a binding member 28, the latter being provided at spaced intervals with suitable adhesive material 29. In using this form of cover or binder, the blank is folded around the package of gum with the adhesive material 29 engaging the adjacent sticks of gum on one side of the package and with the walls 24, 25 and 26 contacting with the package but not adhering thereto so that by merely grasping the loose end 25 of the cover and unfolding the same the sticks of chewing gum will be exposed and can be readily detached from the binding strip in the manner previously stated. This form of the device is very desirable from an advertising viewpoint as it presents four surfaces for display of suitable advertising matter.

If desired, instead of securing the individual sticks of gum along one longitudinal edge of the package, said sticks of gum may be secured together at one end of said package, and to this end I provide a binding element constructed from a blank 30 of the construction shown in Figure 14 of the drawings. This blank 30 is provided adjacent one end thereof with a transverse fold line 31 defining a binding member 32 having its surface coated at spaced intervals with suitable adhesive material 33 for binding engagement with the adjacent ends of the sticks of gum, as best shown in Figure 13 of the drawings. In using this form of the device, the uppermost stick of gum is grasped in the hand and severed from the binding strip by exerting a slight lateral tearing action thereon and the remaining strips of gum may be successively detached in a similar manner.

The sticks of gum shown in this form of the device are likewise secured to the binding strip in book form so that by flexing the package the outer or free ends thereof may be separated to permit ready detachment of the strips of gum from the binder. If desired, instead of having the cover or binder extend entirely around the package, as illustrated in Figure 10 of the drawings, said cover or binder may extend on three sides thereof only, as illustrated at 34 in Figure 15 of the drawings, in which event the binding element 35 will preferably be secured to one longitudinal edge of the package of gum with the top and bottom elements of the cover or binder extending over and bearing against the adjacent walls of the package but having no adherence therewith unless otherwise preferred.

It will be noted that in all forms of the device herein shown and described there is provided a package including a binder and a plurality of individually wrapped superposed sticks of gum secured to the binder in book form and adapted, when flexed, to separate portions of adjacent sticks of gum to permit successive severance of said sticks from the binder. This I consider the salient feature of my invention and it is the purpose of this application to cover any construction of package capable of functioning in the aforesaid manner.

While the package is principally designed for merchandising or vending sticks of chewing gum, it will, of course, be understood that said package may be used for housing and dispensing sticks of chocolate or any kind of confection or other commodities without departing from the spirit of the invention.

Having thus described the invention, what is claimed as new is:

1. A package including a binder, and a plurality of superposed individually wrapped commodities each having one edge thereof secured to the binder and its opposite edge free to permit separation of the free edge of each commodity and selective or successive detachment of said commodities from the binder.

2. A package including a binder, and a plurality of individually wrapped superposed commodities each secured at one edge to the binder in book formation to permit swinging movement of said commodities at their free edges to thereby separate said free edges and permit selective or successive detachment of the commodities from said binder.

3. A package including a binder, and a plurality of individually wrapped superposed sticks of gum each secured at one edge to the binder in book form and adapted when flexed to separate portions of adjacent sticks to permit successive severance of said sticks from the binder.

4. A package including a binder, and a plurality of individually wrapped superposed commodities each having a portion thereof secured to the binder and the remaining portions free to permit initial separation of said free portions and subsequent detachment of the commodities from the binder.

5. A package including a plurality of superposed edible strips, and a binder secured to one edge only of each strip and provided with an extension constituting a covering flap for the adjacent outermost stick of the package and serving to display advertising matter.

6. A package including a plurality of superposed edible strips, and a binder attached to one edge only of each strip at predetermined intervals and provided with an extension constituting a covering flap loosely engaging the adjacent outermost strip of the package and serving to display advertising matter, said strips being adapted to be successively detached from the binder.

7. A package including a plurality of superposed edible strips, an enclosing member extending around the package of strips and provided with a binding element coated with adhesive material and engaging one longitudinal edge only of each strip for holding said strips together in book form.

8. A package including a plurality of superposed commodities and a cover for said package comprising a single blank provided with a longitudinal fold line defining a binding element having adhesive material thereon for engagement with one edge only of each commodity in the package leaving the opposite edge of each commodity free to swing laterally from its bound edge.

9. A package including a plurality of superposed commodities and a cover for said package comprising a single blank having spaced longitudinal fold lines defining a binding element and flap respectively, the binding element being provided with adhesive material for permanent engagement with one edge only of each commodity and the flap being provided with adhesive material for temporary engagement with the opposite edge of each commodity in said package.

10. A package including a plurality of individually wrapped edible sticks disposed in superposed relation, and a binder secured to one end only of each stick in the package for holding said sticks in book form with the opposite end of each stick free to swing laterally from its bound end.

CHARLES C. BALDWIN.